(12) United States Patent
Tate

(10) Patent No.: US 6,508,519 B1
(45) Date of Patent: Jan. 21, 2003

(54) CONTROLLING A BRAKING SYSTEM

(75) Inventor: Derek Tate, Melksham (GB)

(73) Assignee: Westinghouse Brake and Signal Holdings Limited (GB)

(*) Notice: Subject to any disclaimer, the term of this patent is extended or adjusted under 35 U.S.C. 154(b) by 0 days.

(21) Appl. No.: 09/445,157
(22) PCT Filed: Sep. 15, 1999
(86) PCT No.: PCT/GB99/03063
§ 371 (c)(1), (2), (4) Date: Apr. 6, 2000
(87) PCT Pub. No.: WO00/17027
PCT Pub. Date: Mar. 30, 2000

(30) Foreign Application Priority Data

Sep. 21, 1998 (GB) .............................. 9820526

(51) Int. Cl.[7] .............................. B60T 17/22
(52) U.S. Cl. .............................. 303/3; 303/15
(58) Field of Search .............................. 303/3, 7, 9, 15, 303/20

(56) References Cited

U.S. PATENT DOCUMENTS

| 4,056,286 A | 11/1977 | Burkett | |
| 4,861,115 A | 8/1989 | Peterson | |
| 5,039,038 A | 8/1991 | Nichols et al. | |
| 5,564,795 A | * 10/1996 | Engle | 303/9 |
| 5,722,736 A | * 3/1998 | Cook | 303/15 |
| 5,887,953 A | * 3/1999 | Wood et al. | 303/7 |
| 5,924,774 A | * 7/1999 | Cook et al. | 303/3 |
| 6,189,980 B1 | * 2/2001 | Kull | 303/7 |

FOREIGN PATENT DOCUMENTS

| DE | 4417667 | 11/1995 |
| EP | 1087901 | 7/1986 |
| EP | A-0 738 641 | 6/1996 |
| WO | WO9938743 | 8/1999 |

* cited by examiner

Primary Examiner—Christopher P. Schwartz
(74) Attorney, Agent, or Firm—Lee, Mann, Smith, McWilliams Sweeney & Ohlson

(57) ABSTRACT

Apparatus for controlling a brake system operable using an air supply, includes an electronic control (8) for controlling air distribution and air to an air to electrical converter (12) for generating an electrical supply for energising the electronic control using air under pressure from the air supply (1). Air distribution is controlled either as a result of sensed pressure in a brake control pressure pipe (6) or as a result of an electronic brake control signal.

9 Claims, 3 Drawing Sheets

CONTROLLING A BRAKING SYSTEM

The present invention relates to apparatus for controlling a braking system.

A friction braking system for a railway train is powered from an air supply. The level of brake demand has been traditionally controlled by an on car control valve (the distributor valve) which senses the air pressure in a brake control pressure pipe, the pressure in this pipe dictating the current brake demand.

Such a system has generally (but not always) been used for freight applications where no electrical supply has been available.

However the rail industry may move in the future to a system where an electrical supply is made available throughout the train. In this circumstance the brake control pressure pipe control system will be replaced with an electrical equivalent, i.e. a serial communications link or a radio link.

Nevertheless, a period of time will exist where trains will be made up of mixed cars, some being purely air controlled and some electrically controlled. In the transition period the electrically controlled units will need to be dual systems being able to use either the brake control pressure pipe or the electrical control signal system.

According to the present invention, there is provided apparatus for controlling a brake system operable using an air supply, the apparatus including electronic control means for controlling air distribution and air to electrical conversion means for generating an electrical supply for energising the electronic control means using air under pressure from said air supply.

Said air supply could be derived from sources including a train brake control pressure pipe or a train brake supply pipe, for example.

Said air to electrical conversion means may be supplied with said air under pressure directly from said air supply.

The apparatus may include a distributor valve coupled with said air supply and which is controlled by said electronic control means and distributes air to at least one brake actuator of the apparatus via a supply connection.

In this case said air to electrical conversion means may be supplied with said air under pressure from an exhaust outlet of said distributor valve and/or from said supply connection.

Said electronic control means may control air distribution either as a result of sensed pressure in a brake control pressure pipe or as a result of an electronic brake control signal. Such an electronic brake control signal may be providable via a signal line and/or a radio link control (which control may have an electrical supply provided by said air to electrical-conversion means).

Figure 1:
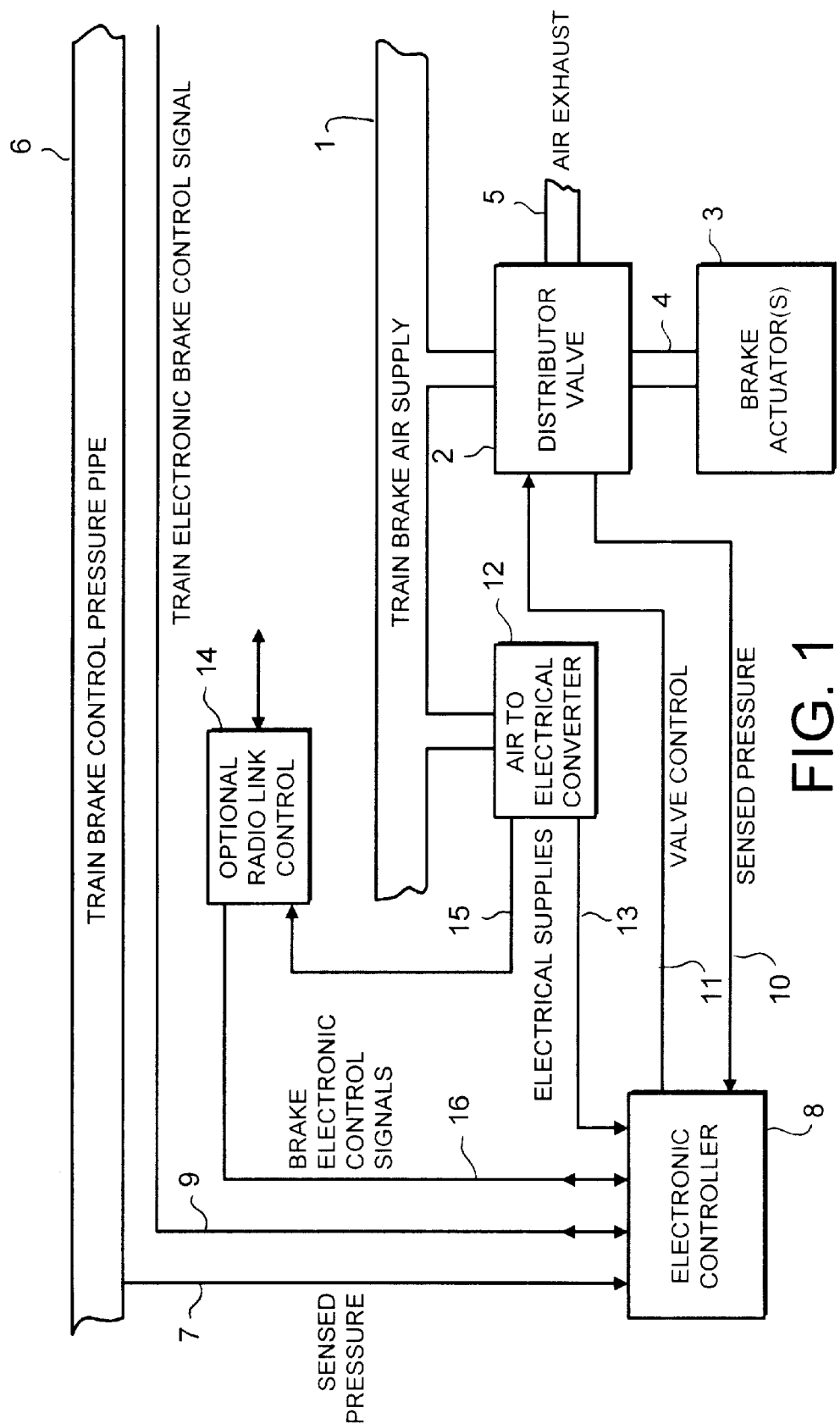
Figure 2:
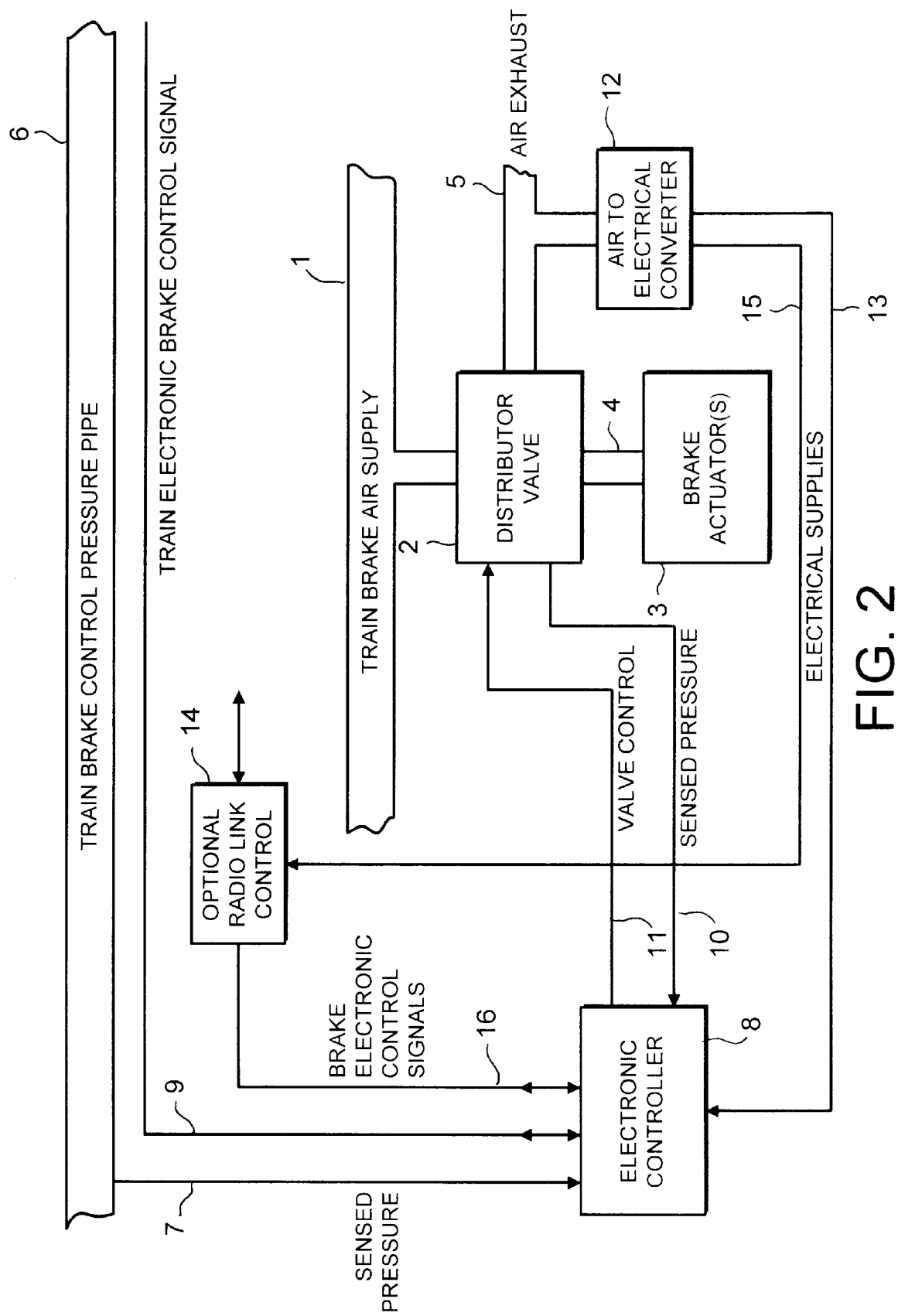
Figure 3:
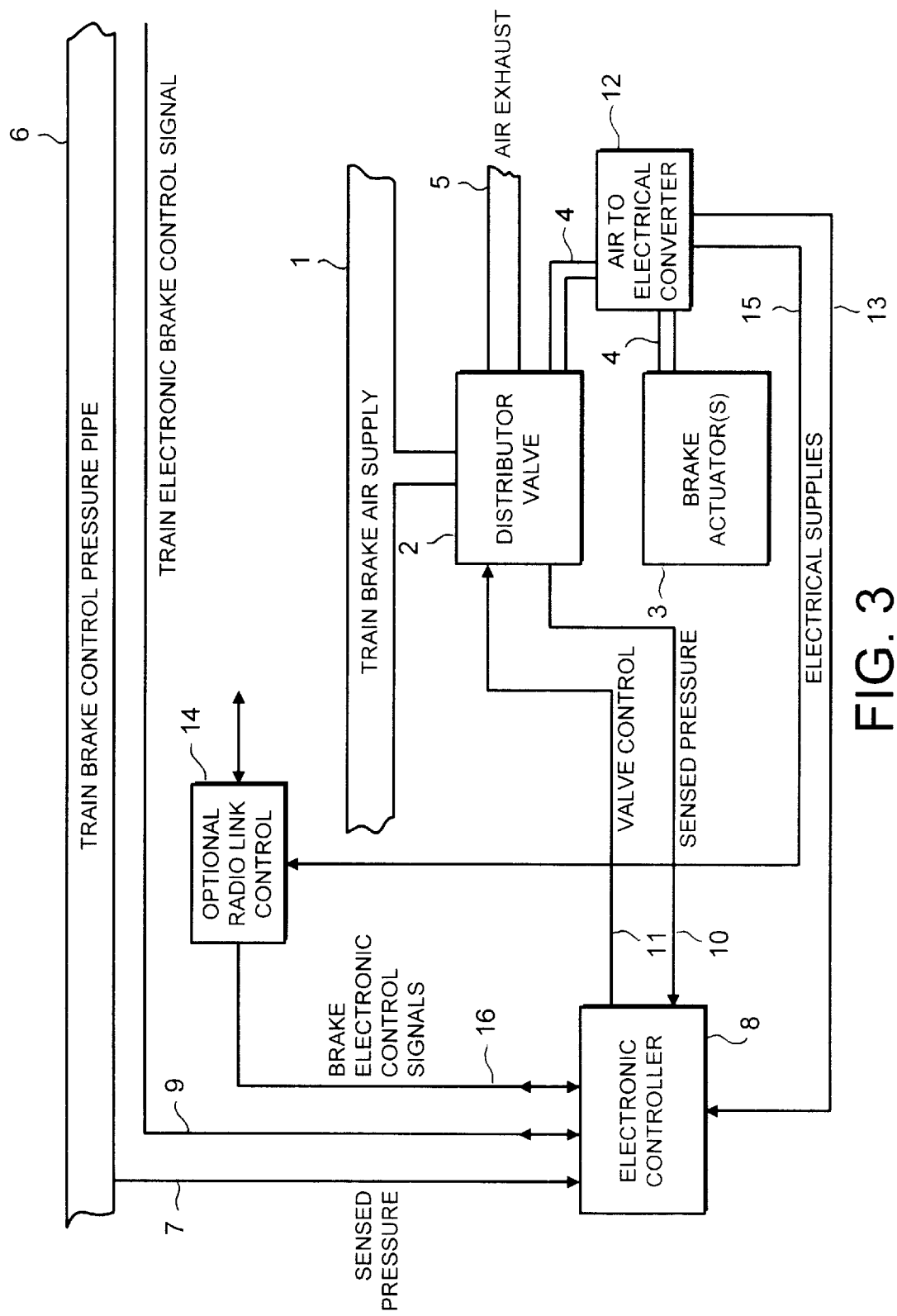

The present invention will now be described, by way of example, with reference to the accompanying drawings, in which:

FIG. 1 is a schematic representation of apparatus according to an example of the invention; and FIGS. 2 and 3 are schematic representations of apparatus according to alternative examples of the invention.

Referring to FIGS. 1, 2 and 3, in which the same reference numerals are used for the same items, reference numeral 1 designates a train brake air supply line, reference numeral 2 designates a distributor valve which distributes air to one or more brake actuators 3 via a supply connection 4 and reference numeral 5 designates an air exhaust outlet of valve 2.

Reference numeral 6 designates a train brake control pressure pipe from which a signal representing sensed pressure on a line 7 is applied to an electronic controller 8, which also receives on a line 9 a train electronic brake control signal and on a line 10 a signal representing sensed pressure from distributor valve 2. On a line 11, controller 8 provides a valve control signal to distributor valve 2.

In the FIG. 1 example, an air to electrical converter 12 is fed with air directly from supply line 1 and provides an electrical supply to controller 8 on a line 13. However, the air supply may be instead supplied from the air exhaust outlet 5 as shown in FIG. 2 or from the air supply connection 4 as shown in FIG. 3 (or by a combination of two or more of the techniques of FIGS. 1, 2 and 3).

In each example, the apparatus may operate as a dual system in that the electronic controller 8 is able to respond either to the brake control pressure pipe signal or the electrical signal, so will be able to function in either environment.

In each example, the apparatus draws its power by converting air under pressure into electrical energy via converter 12, from the air supply line 1 in the case of FIG. 1, the air exhaust outlet 5 in the case of FIG. 2 or the air supply connection 4 in the case of FIG. 3. The electrical energy produced is used to power electronic controller 8. This in turn monitors the input control signal and produces output control signals to the distributor valve 2. This ensures the air pressure sent to the brake actuator(s) results in the required level of brake effort.

No extra energy down the train, local generation or storage is therefore required.

In each example, in addition to or as an alternative to the provision of signals on line 9, there may be an optional radio link control 14, whose electrical supply is provided on a line 15 from converter 12, control 14 providing brake electronic control signals to controller 8 on a line 16.

What is claimed is:

1. Apparatus for controlling the operation of a braking system operable using a pressurized air supply to actuate air operated brake actuators in the brake system, the apparatus comprising:

electronic control means for controlling an air distribution device operatively connected to the air operated brake actuators in the brake system during operation of the brake system;

air to electrical conversion means using air under pressure from said air supply as a power source applied to said air to electrical conversion means to generate an electrical supply for energizing the electronic control means;

said electronic control means controlling air distribution from said pressurized air supply to said air actuated brakes.

2. Apparatus according to claim 1, wherein said electronic control means may control air distribution as a result of one of sensed pressure in a brake control pressure pipe and an electronic brake control signal.

3. Apparatus according to claim 2, including a radio link control for providing said electronic brake control signal.

4. Apparatus according to claim 3, wherein said radio link control has an electrical supply provided by said air to electrical conversion means.

5. Apparatus according to claim 2, wherein said electronic brake control signal is providable via a signal line.

6. Apparatus according to claim 1, including a distributor valve coupled with said air supply and which distributor valve is controlled by said electronic control means and distributes air to at least one brake actuator of the apparatus via a supply connection.

7. Apparatus according to claim 6, wherein said air to electrical conversion means is supplied with said air under pressure from an exhaust outlet of said distributor valve.

8. Apparatus according to claim 6, wherein said air to electrical conversion means is supplied with said air under pressure directly from said air supply.

9. Apparatus according to claim 1, wherein said air to electrical conversion means is supplied with said air under pressure from said supply connection.

\* \* \* \* \*